United States Patent [19]

Smith

[11] 3,929,323
[45] Dec. 30, 1975

[54] EXTRUDER FEED SECTION

[75] Inventor: David J. Smith, Belle Meade, N.J.

[73] Assignee: Egan Machinery Company, Somerville, N.J.

[22] Filed: Nov. 14, 1974

[21] Appl. No.: 523,815

[52] U.S. Cl. ............................................. 259/192
[51] Int. Cl.² ........................................ B29B 1/10
[58] Field of Search ............. 259/191, 192, 193, 97, 259/5, 6, 21, 40, 41; 418/197, 200; 425/207, 208, 209

[56] References Cited
UNITED STATES PATENTS

| | | | |
|---|---|---|---|
| 2,592,476 | 4/1952 | Sennet | 418/197 |
| 2,693,762 | 11/1954 | Sennet | 418/197 |
| 3,310,837 | 3/1967 | Wittrock | 259/192 |
| 3,744,770 | 7/1973 | Ocker | 259/192 |

Primary Examiner—Robert W. Jenkins
Attorney, Agent, or Firm—Harry B. Rook

[57] ABSTRACT

A single screw extruder for processing plastic material in particulate form which becomes soft and tacky during mechanical working, includes an extruder barrel and a feed section housing through which extends a bore in which is rotatable an extruder screw in said barrel and a main feed screw and an auxiliary feed screw in the feed section, with the main feed screw connected coaxially to said extruder screw. The feed section has a feed inlet at the end of said main feed screw opposite the extruder screw. The auxiliary feed screw has a helical groove whose helix is the reverse of the helix of the main feed screw and is held rotatably in mesh with the main feed screw by a retainer piece that extends through a slot in the feed section housing and has an arcuate groove in running contact with the auxiliary feed screw. The auxiliary feed screw is driven only by the power driven main feed screw and in the opposite direction, whereby to positively convey said plastic material from the feed inlet to said extruder screw, with a minimum of possibility of the material adhering to the feed screws.

5 Claims, 4 Drawing Figures

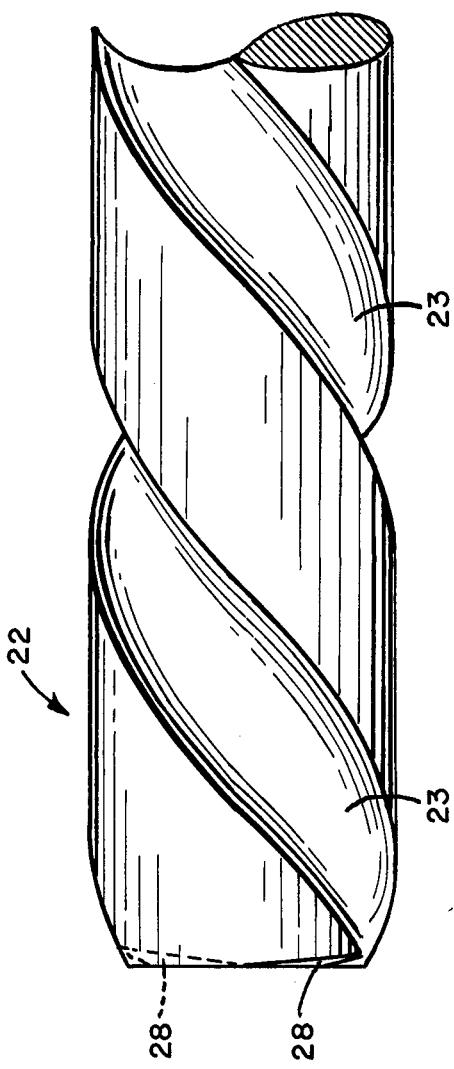
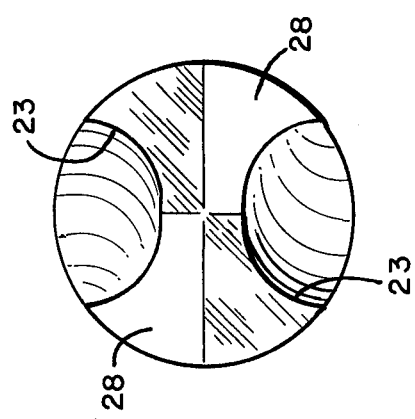

3,929,323

EXTRUDER FEED SECTION

BACKGROUND OF THE INVENTION

This invention relates to a single screw extruder used to extrude plastic materials and in particular to improvements to a single screw extruder that provide a means of satisfactorily and continuously feeding materials which heretofore have been extremely difficult or impossible to feed.

Plastic materials, such as polyethylene and polypropylene, in the physical form of pellets or granules are usually satisfactorily fed to a single screw extruder by means of a simple gravity type hopper through a feed opening in the extruder barrel where the material is engaged by the rotating extruder screw and conveyed by the screw in the direction of discharge end of the extruder, the material undergoing melting and mixing on the way. However, certain plastics materials, among which are included materials or mixtures of materials that are loosely classified as "hot melts," cause considerable difficulty when attempts are made to feed them through the hopper and feed opening and to convey the materials by means of the extruder screw from the feed opening in the direction of the discharge end of the barrel. The term "hot melts" as it is used herein, refers to plastic materials or mixtures of plastic materials that are, at normal ambient temperatures, in the form of solid particles and which may be transformed by heat and/or mechanical working to a molten condition in the extruder. In addition, the term "hot melts" also refers to materials which are liquid at normal ambient temperatures or mixtures of such liquids with the aforementioned solid particles and which are to be processed in a single screw plastics extruder. The hot melts may or may not be tacky at normal ambient temperatures, but all become tacky upon the application of heat and mechanical working; and this stickiness causes considerable difficulty in conveying the hot melt from the feed opening of the extruder in the direction of the discharge end of the barrel. This difficulty of conveying is believed due to the hot melt adhering to the rotating screw instead of being forwarded by it.

Another conveying difficulty arises when hot melt mixtures contain components of different melting points. The lower melting point component or components melt before the higher melting point components and adhere to the screw instead of being forwarded by the screw, thus forming a plug of material in the barrel just downstream of the feed opening which stops or restricts conveying of the hot melt.

Examples of hot melts which heretofore have been extremely difficult to process in a single screw extruder may be found in U.S. Pat. No. 3,592,710. Hot melts of these types are somewhat tacky at normal ambient temperatures and have at least one component of the mixture having a melting point considerably lower than that of the component having the highest melting point. The present invention has successfully processed hot melts of these types, but it is not limited to such types and may be satisfactorily used to process hot melts as defined heretofore; that is, the hot melt may or may not be sticky at normal ambient temperature and may or may not have one component with a lower melting point than another component.

Attempts have been made to improve the conveying of a hot melt from the feed opening in the direction of the discharge end of the barrel by various combinations of barrel and screw temperatures and by the use of various screw and barrel configurations but with only limited success. In some cases conveying has been accomplished but with unevenness of feed resulting in unacceptable variations or surges in the output of the extruder.

SUMMARY OF THE INVENTION

The present invention eliminates the aforementioned difficulties by providing a positive feed from the feed opening of a single screw extruder which positively conveys the hot melt material from the feed opening in the direction of the discharge end of the extruder. The improvement comprises an auxiliary feed screw located with its axis parallel to the extruder screw and meshing with the extruder screw and extending from the rear of the feed opening toward the direction of the discharge end of the extruder. The auxiliary feed screw is not driven by any external source but rather is driven in opposite rotational direction to the extruder screw by the extruder screw itself, through meshing or gear-like surface contact of the feed screw with the extruder screw.

A BRIEF DESCRIPTION OF THE DRAWINGS

FIG. 3 is an end view of the auxiliary feed screw.

FIG. 4 is a side elevation of a portion of the auxiliary feed screw.

DESCRIPTION OF THE PREFERRED EMBODIMENT

Figure 1:
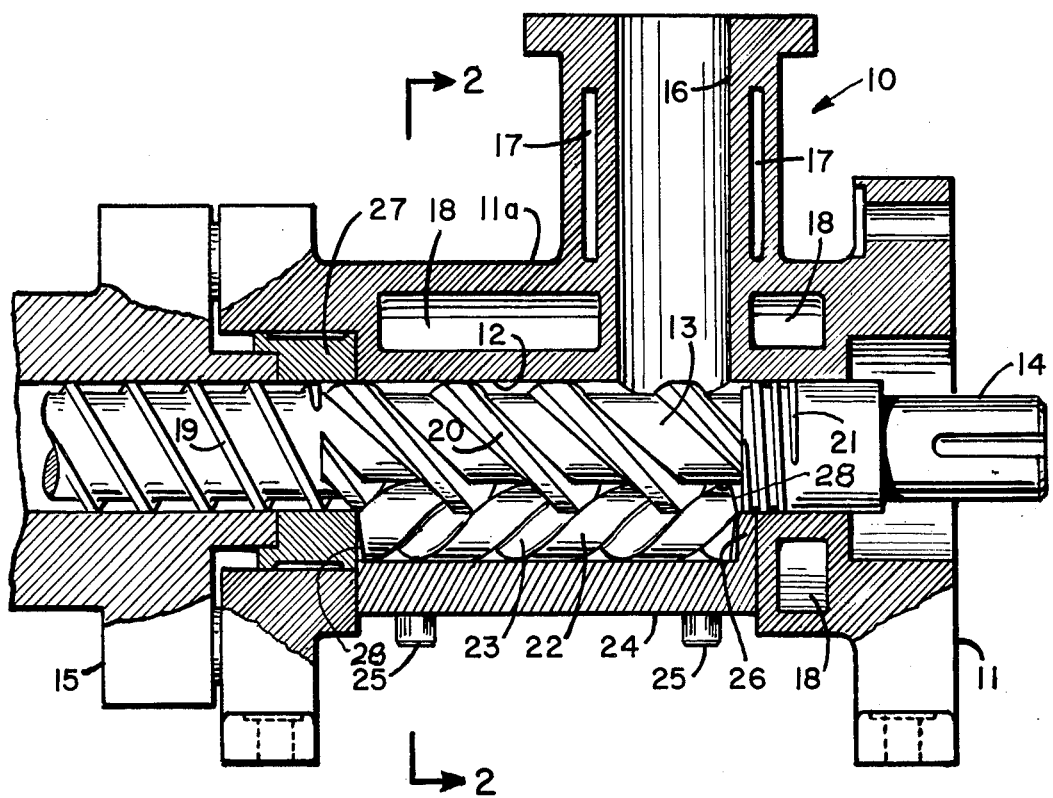
FIG. 1 is a partial longitudinal section taken through the feed section of a single screw plastics extruder incorporating the present invention.

In FIG. 1 the feed section of a single screw plastics extruder is represented by 10. The feed section comprises a housing 11 with a barrel 11a having a bore 12 in which is rotatably positioned extruder screw 13. Extruder screw 13 is rotated by conventional means, not shown, coupled to extruder screw extension 14. Bolted to the discharge end of the body 11 of the feed section is extruder barrel 15 which terminates in a discharge orifice such as a known type of extruding die (not shown) to the left of the drawing.

At the feed end of the feed section body is located feed opening 16 extending vertically upwards perpendicularly to the axis of the screws. The portion of the feed section body forming the feed opening is jacketed for cooling liquid as by passages 17. The portion of the feed section body 11 enclosing the extruder screw is jacketed for cooling or heating, as desired, such as by passages 18.

Extruder screw 13 is provided at its front or discharge end with conventional material processing helical conveying flights 19 in the extruder barrel section. The configuration of these flights may be designed to optimize conveying, melting and mixing of particular materials as is known in the art. At the rear end of the processing flights 19 and between said flights and the rear of the feed opening 16, the extruder screw is provided with helical feed flights 20 which in the embodiment shown are threads of double lead with cylindrical top portions 20a and convex flanks 20b although other multiple lead flights may be used. A helical sealing thread 21 may be provided on the rear portion of the screw to prevent material from leaking back through the rear portion of the feed section. Extending parallel to and along a substantial portion of the portion of the extruder screw containing the feed flights 20 is auxiliary feed screw 22. The auxiliary feed screw is provided with helical grooves 23 whose helix is the reverse of the helix of the feed flights 20 and which have concave flanks and closely mesh with the feed flights 20. The feed flights 20 of the extruder screw and the grooves 23 of the auxiliary feed screw are preferably of the well known design used in rotary screw type pumps, as for example the "IMO" pump, manufactured by Delaval Turbine, Inc., and pumps of the type shown in U.S. Pat. Nos. 2,693,762 and 2,693,763.

Auxiliary feed screw 22 is held in intermeshing relationship with the extruder screw by retainer piece 24 extending into a slot 11b in the body 11 of the feed section communicating with the bore 12, and the retainer piece is held in place on the feed section by bolts 25. The portion of the retainer piece adjacent to the auxiliary feed screw has a groove 24a that is arcuate in cross-section and is radiused to conform approximately to the circumference of the auxiliary feed screw. In order to maintain axial position of the auxiliary feed screw, retainer piece 24 is provided at one end with an upstanding lug 26 extending into the slot in the feed section to prevent the auxiliary screw moving toward the rear of the feed section. Movement of the auxiliary screw toward the discharge end of the extruder is prevented by thrust ring 27 inserted within a counterbore in the feed section and held in place by the extruder barrel. Although the thrust forces of the auxiliary feed screw are minor, it is preferred that the surfaces of the lug 26 and thrust ring 27 which are adjacent to the ends of the auxiliary feed screw be hardened to prevent wear. The ends of the auxiliary feed screw may be flat or may be provided with beveled portions, shown as 28 in FIGS. 3 and 4, to form a thrust bearing using the hot melt material being processed as a lubricant.

Figure 2:
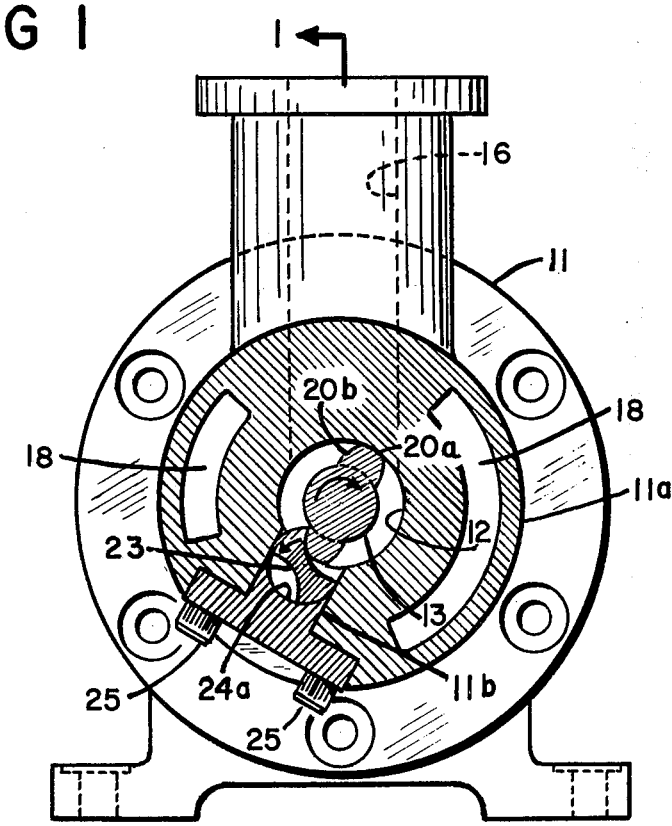
FIG. 2 is a section taken through 2—2 of FIG. 1.

The distance between the axial centerlines of the extruder screw and the auxiliary feed screw is set so that very small clearances are obtained between the flights of the extruder screw flights and the grooves of the auxiliary feed screw and also between the root diameter of the extruder screw and the outside diameter of the auxiliary feed screw. Only the extruder screw is positively driven, and rotation of the extruder screw will result in rotation in the opposite direction of the auxiliary feed screw, as shown by the arrows in FIG. 2, due to the contact between the sides of the flights on the extruder screw and the sides of the grooves on the auxiliary feed screw. Thus the two screws rotating in opposite directions practically ensure that particulate material, including hot melts and regardless of composition, fed to the feed inlet 16 of the extruder will be positively conveyed from the feed opening to the material processing flights 19 of the extruder screw; and the possibility of the material adhering to the feed screws is reduced to the minimum.

I claim:

1. A single screw extruder for processing hot melt plastic material which becomes tacky during processing, said extruder comprising:

a feed section housing having an extruder barrel connected thereto and a bore extending through said housing and said barrel;

means defining feed inlet and discharge outlet passages communicating respectively with the feed end and the discharge end of the bore;

an extruder screw rotatably mounted in said bore having a helical material processing screw thread portion in said extruder barrel, and a helical feed flight screw thread portion between said processing screw thread portion and said feed inlet passage having a running clearance with the wall of the bore to feed said material from said feed inlet passage to said material processing screw thread;

an auxiliary feed screw rotatably retained in the housing with its axis parallel to the axis of the extruder screw and having a helical groove whose helix is the reverse of and in mesh with said helical feed flight screw thread portion of the extruder screw;

means for drivingly connecting said extruder screw to means for rotating it;

there being a driving contact between the auxiliary feed screw and the flight screw thread portion of the extruder screw, and the auxiliary feed screw being rotatably driven solely by said feed flight screw thread portion of the extruder screw in opposite rotation to the extruder screw, and said feed flight screw thread portion of the extruder screw and said auxiliary feed screw being coactive to feed said material from said feed inlet to the material processing portion of the extruder screw.

2. A single screw extruder as defined in claim 1 wherein said main feed screw comprises a thread having a cylindrical top portion and convex flanks and the thread of said auxiliary feed screw has a groove with concave flanks, and the distance between the axial centerlines of the two screws is set such that there are running clearances between the feed screw thread, the wall of the bore and the groove of the auxiliary feed screw.

3. A single screw extruder as defined in claim 1, wherein there is a retainer piece removably secured on said housing and formed with a portion extending through a slot in the housing and having a groove arcuate in cross-section conforming to and engaging with a running clearance the circumferential surface of the auxiliary feed screw.

4. A single screw extruder as defined in claim 3 wherein said retainer piece has a laterally projecting lug at one end frictionally abutted by one end of said auxiliary feed screw, and there is a thrust ring in said housing frictionally abutted by the other end of said auxiliary feed screw.

5. A single screw extruder as defined in claim 4 wherein the ends of said auxiliary feed screw have tapered surfaces whereby the plastic material being processed serves as a lubricant between said tapered surfaces and the corresponding abutting surfaces.

* * * * *